Jan. 21, 1969     E. A. MILLER     3,423,643
ELECTROLYTIC CELL WITH ELECTROLYTE CONTAINING SILVER SALT
Filed May 31, 1966
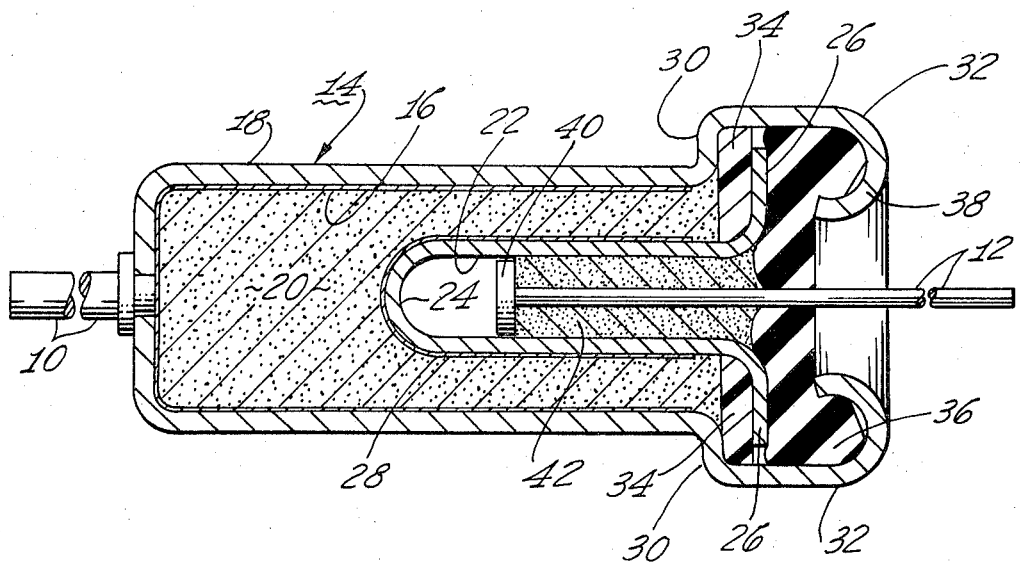
INVENTOR:
EDMUND A. MILLER
ATTORNEYS

3,423,643
ELECTROLYTIC CELL WITH ELECTROLYTE CONTAINING SILVER SALT

Edmund A. Miller, Santa Monica, Calif., assignor to The Bissett-Berman Corporation, Santa Monica, Calif., a corporation of California
Filed May 31, 1966, Ser. No. 554,003
U.S. Cl. 317—231                17 Claims
Int. Cl. H01g 9/00

---

ABSTRACT OF THE DISCLOSURE

An electrolytic cell comprises a container with electrodes and a liquid electrolyte solution of a silver salt and an acid sealed within it. One electrode has a non-reactive surface contacting the electrolyte and another has a silver surface for supplying silver ions.

---

This invention relates to an electrolyte for use in an electrolytic cell. In particular, the present invention relates to an electrolytic cell in combination with an electrolyte of a particular composition.

Electrolytic cells have been used in the past to provide many functions. For example, an electrolytic capacitor is basically an electrolytic cell. In addition, electrolytic cells have been used as part of various types of systems to provide a timing function. The present invention is directed primarily to an electrolytic cell which is of the type as disclosed in copending application Ser. No. 179,847 filed Mar. 15, 1962, in the name of Thomas B. Bissett and assigned to the assignee of the instant application, and as disclosed in copending application Ser. No. 519,634 filed Jan. 10, 1966, in the name of Martin Mintz and assigned to the assignee of the instant application.

The present invention, therefore, relates to an electrolytic cell which includes at least a pair of electrodes immersed in an electrolyte to provide for the passage of current and the transfer of metal from one electrode to the other electrode. One of the electrodes is generally composed of a metal chemically inert or non-reactive with the electrolyte or includes a layer of inert metal and the other electrode is composed of a metal electrochemically active with the electrolyte. When a voltage of a proper polarity is impressed across the electrodes there is a transfer of the active metal from one electrode to the other electrode.

Since the electrolytic cell as described above relates to the transfer of metal from a first electrode to a second electrode over a particular period of time, the transfer function may be controlled so as to use the electrolytic cell as a timer or as part of a system for providing a time function. For example, an electrolytic cell may operate as an integrator or as a storage device. The electrolytic cell may also be used to provide a control function since an increase in voltage appears across the electrolytic cell after the transfer of all of the active metal from the first electrode to the second electrode. The electrolytic cell may, therefore, be used to provide a control of the operation of various devices such as satellites, sonobuoys, missiles, etc.

In addition, the electrolytic cell may be used as a portable radar receiver and radar detector, or for timing circuits such as multivibrators. A clearer appreciation of the many applications of the electrolytic cell of the present invention will be had with reference to the copending applications indicated above. In the many uses of the electrolytic cell described above and with reference to the copending applications, it is desirable to provide for a stable operation of the electrolytic cell and with an absence of current flow in the cell other than the current flow which is directly attributable to an input signal. In addition, it is desirable that the electrolytic cell maintain a sharp transition point between the time that active material is being transferred from one electrode to the other electrode and when the active material is completely transferred.

The copending application Ser. No. 519,634 provided for certain improvements in electrolytic cells and in particular disclosed an electrolytic cell wherein a container which is composed of an electrochemically active metal such as silver is used both as the outer housing of the cell and as one electrode of the cell. In addition, the inner electrode of the cell is composed of a chemically inert or non-reactive metal such as gold, or is composed of an active metal and the active metal is plated with an inert metal such as gold so that the inner electrode operates as an inert electrode. The particular advantages of this construction for an electrolytic cell are disclosed with reference to copending application Ser. No. 519,634. The present invention is particularly directed to improvements in the electrolytic cell with reference to the electrolyte which is used in electrolytic cells as described above.

It is desirable to provide an electrolyte for use in the electrolytic cells as described above which operates over a wide temperature range and which is electrochemically active with the silver. In addition, it is desirable to use an electrolyte material which will not attack the active materials in the electrolytic cell over this wide temperature range. In particular, this invention provides for an electrolytic cell which uses as an electrolyte a weak acid.

When the electrolytic cell uses silver as the active material, the electrolyte may be composed of silver phosphate ($Ag_3PO_4$) in a solution of phosphoric acid ($H_3PO_4$). Specifically, the composition of the electrolyte of the present invention may be one normal silver phosphate (1 N $Ag_3PO_4$) in a 62% solution of phosphoric acid ($H_3PO_4$). It is to be appreciated that other concentrations of the silver phosphate and phosphoric acid may be used in accordance with specific requirements of the electrolytic cell.

The use of an electrolyte as described has certain important advantages. First, the electrolyte is similar to water in its response to electrical current and, therefore, provides a relatively high impedance to produce a high voltage drop across the electrolytic cell when all of the active material is transferred from one electrode to the other electrode. As indicated above, the electrolyte of the present invention operates over a wide temperature range without attacking the active material. In particular, the electrolyte of the present invention operates over a temperature range at least between $-55°$ C. to $+75°$ C. Actually, the electrolyte of the present invention operates over a temperature range greater than that disclosed above.

The electrolyte of the present invention also provides for an accurate transfer of the active material so that the current flow due to the input signal is the only current flow within the electrolytic cell. In addition, the electrolyte of the present invention does not attack the active material so as to provide for an improper indication of current flow. The electrolyte of the present invention also has a low viscosity and is therefore easy to work with in the manufacture of the electrolytic cell.

The invention, therefore, relates to the use of a weak acid such as phosphoric acid for use as part of an electrolyte in an electrolytic cell. It is the be appreciated that other weak acids may be used in place of phosphoric acid. For example, perchloric acid ($HClO_4$) may be used in the electrolyte, but perchloric acid will not operate over a temperature as extended as the temperature range over which phosphoric acid can operate.

The invention, however, is directed to the use of a weak acid as part of an electrolyte within an electrolytic cell which provides a wide operating temperature range, provides for an accurate transfer of the active material from one electrode to the other electrode, does not dissolve the active material, has a relatively low operating voltage drop across the cell but a high voltage drop upon the complete transfer of the active material from one electrode to the other electrode, and may be stored for a long time without deterioration.

A clearer understanding of the invention may be had with reference to the following description and drawing which illustrates a cross-sectional view of an electrolytic cell of the present invention incorporating an electrolyte which provides for the above listed advantages.

In the drawing, the electrolytic cell includes a first lead 10 and a second lead 12. The leads 10 and 12 are coupled to a container 14 which is composed of an inner lining 16 and an outer covering 18. The inner lining 16 is constructed of an electrochemically active material, for example, silver. The outer covering 18 is composed of an electrochemically inert or non-reactive material such as ceramic, glass, steel, brass, Teflon, or any other suitable material. The active portion 16 of the container 14 is electrically connected to the lead 10. Enclosed within the container 14 is an electrolyte 20 which will be described later in greater detail.

The second lead 12 is attached to an inner electrode 22. The inner electrode 22 has a rounded portion 24 which extends within the container 14. The inner electrode 22 also includes a flanged end 26 which is used to support the inner electrode 22 within the container 14. The inner electrode 22 is also coated with a masking layer of electrochemically inert or non-reactive material 28, preferably gold when the inner electrode 22 is an active metal, so that the electrode 22 may act as the inert electrode within the electrolytic cell.

The open end of the container 14 has a shoulder 30 and a cylindrical wall 32. A flexible washer 34 is disposed within the container 14 against the shoulder 30. The inner electrode 22 is then disposed within the container 14 so that the flange 26 of the electrode 22 compresses the washer 34 against the shoulder 30 to provide for a seal of the electrolyte 20 within the container 14. A second washer 36 is then placed within the cylindrical portion 32 of the container 14 and the cylindrical portion 32 is crimped as shown at position 38 so as to lock the inner electrode within the container 14 and to provide a tight seal of the electrolyte within the electrolytic cell.

Before the second washer 36 is placed within the cylindrical portion 32, the lead 12 is positioned within the inner electrode 22 and a cylindrical disc 40 at the end of the lead 12 is soldered to the inner surface of the inner electrode 22 by solder material 42. Additional details of the structure of the electrolytic cell as shown in the drawing and the structure of other electrolytic cells which may be used in the present invention and the operation of the electrolytic cells will be had with reference to the copending applications Ser. No. 179,847 and 519,634 referred to above.

The electrolyte 20 of the present invention is a weak acid solution which is not very corrosive or explosive and which is electrochemically active with the silver surface and electrochemically inert or non-reactive with the layer of inert material 28. The weak acid solution of the present invention has a wide operating temperature range and provides for an efficient transfer of the silver material without dissolving a great deal of the silver. In addition, the electrolytic material of the present invention has a low operating voltage drop during the transfer of the silver with a high stop voltage upon the transfer of all of the silver material from one electrode to the other electrode.

In particular, the electrolyte of the present invention may be composed of one normal silver phosphate (1 N $Ag_3PO_4$) in a 62% solution of phosphoric acid ($H_3PO_4$). This particular composition provides for a very high range of temperature operation for the electrolytic cell. In addition, the phosphoric acid is similar in operation to water for the passage of electrical current. The phosphoric acid provides for a high impedance to the transfer of electrical current when all of the silver has been transferred from one electrode to the other electrode. This high impedance is desirable so that a high stop voltage or voltage drop across the electrolytic cell is provided when all of the silver is transferred from one electrode to the other electrode. The increase in voltage drop across the electrolytic cell is desirable for various control functions as described in the copending applications.

The particular composition of the electrolyte 20 as described above also provides for an accurate transfer of the silver in accordance with the flow of electrons induced by the input voltage. The current flow is therefore proportional to the input voltage to provide for the transfer of the silver from one electrode to the other. Since the electrolyte is only mildly corrosive, the silver is not transferred except when the input voltage is applied across the electrolytic cell.

The particular composition of the electrolyte 20 as indicated above also has a relatively low viscosity so that it is easy in manufacturing the electrolytic cell to insert the electrolyte into the container 14. Also, the particular composition of the electrolyte 20 as described above is very close to the eutectic point for a solution of phosphoric acid in water. At this eutectic point the freezing temperature for the solution is very low and in particular the freezing point is $-85°$ C. The electrolyte of the present invention, therefore, operates at very low temperatures. Specifically, the electrolyte of the present invention as described above operates from temperatures below $-55°$ C. to above $+75°$ C.

It may be possible to use other acid solutions so as to provide most of the desired functions for the electrolyte 20. For example, perchloric acid ($HClO_4$) might be used for the electrolyte of the present invention. At normal temperatures perchloric acid is less corrosive than phosphoric acid so that it dissolves even less silver than phosphoric acid. However, at higher temperatures perchloric acid becomes very corrosive and will dissolve the silver very quickly so that although perchloric acid may be used for the electrolyte of the present invention, the temperature range is restricted. Phosphoric acid is, therefore, the preferred material to use for the electrolyte 20.

The concentration of the solution of phosphoric acid as indicated above is the preferred concentration but it is to be appreciated that other concentrations may be used. For example, the phosphoric acid may range from a 30% solution of phosphoric acid to an 85% solution of phosphoric acid. In addition, the silver phosphate content of the electrolyte may range from 0.1 N $Ag_3PO_4$ to 3 N $Ag_3PO_4$.

The particular concentration of the silver phosphate and the phosphoric acid depends on the particular use to be made of the electrolytic cell. For example, with a high concentration for the solution of phosphoric acid, a higher concentration of the silver phosphate can be obtained. The high concentration of the silver phosphate in the solution of phosphoric acid is sometimes desirable for use with high current density analog memory structures. The lower concentration of the silver phosphate may be used to provide a better cyclic performance at low temperatures and low currents. This low concentration of the silver phosphate facilitates the stripping of the silver at the electrode so as to provide for a greater accuracy for low current applications. Also, the low concentration of the solution of phosphoric acid provides for a lower viscosity electrolyte which is generally easier to work with in the manufacture of electrolytic cells.

It is to be appreciated that the invention has been described with reference to particular embodiments but that various modifications and adaptations may be used. Generally, the invention relates to the use of an electrolytic cell having an electrolyte which is a weak acid solution so as to provide for a wide operating temperature range, a high efficiency, a low corrosive effect on the active material within the electrolytic cell, a low operating voltage drop, a high stop voltage useful in providing an indication when all of the active material has been transferred from one electrode to the other electrode, and a long storage time for the electrolytic cell.

The particular embodiment of the invention which has been disclosed relates to the use of silver phosphate in a solution of phosphoric acid. It has also been indicated that perchloric acid may be used in place of the phosphoric acid with a loss in the temperature range of operation of the electrolytic cell. In particular, a 40% solution of perchloric acid may be used as an optimum figure in place of the phosphoric acid, but it is to be appreciated that other concentrations of perchloric acid may be used. The invention, therefore, is only to be limited by the appended claims.

What is claimed is:
1. An electrolytic cell in combination, comprising
a liquid solution electrolyte,
a first electrode having a silver surface in contact and electrochemically active with said electrolyte, and
a second electrode, spaced from the first electrode, having a surface in contact and chemically inert to said electrolyte,
said electrolyte comprising a composition of a silver salt in a solution of phosphoric acid ($H_3PO_4$) or perchloric acid ($HClO_4$).

2. The electrolytic cell set forth in claim 1 wherein one of the first and second electrodes constitutes a casing holding said electrolyte and electrically insulated from the other electrode.

3. The electrolytic cell set forth in claim 1 wherein the silver salt is a silver phosphate ($Ag_3PO_4$) of approximately one (1) normal (N) in a solution of approximately 62% phosphoric acid ($H_3PO_4$).

4. The electrolytic cell set forth in claim 1 wherein the silver salt is a silver phosphate ($Ag_3PO_4$) ranging between 0.1 N and 3 N in a solution of phosphoric acid ranging between 30% $H_3PO_4$ and 85% $H_3PO_4$.

5. The electrolytic cell set forth in claim 4 wherein one of the first and second electrodes constitutes a casing holding said electrolyte and electrically insulated from the other electrode and wherein silver is also disposed in a layer on the chemically inert surface of the second electrode.

6. The electrolytic cell set forth in claim 4 wherein the chemically inert surface is gold.

7. In an electrolytic cell having a first electrode with a silver surface and a second electrode spaced from the first electrode and with a surface more chemically non-reactive than the silver surface,
an electrolyte in contact and electrochemically active with the silver surface and in contact with and chemically inert relative to the surface on the second electrode, the electrolyte comprising a combination of a silver salt in a solution of phosphoric acid ($H_3PO_4$) or perchloric acid ($HClO_4$).

8. In the electrolytic cell set forth in claim 7, the silver salt constituting a silver phosphate ($Ag_3PO_4$) ranging between 0.1 N and 3 N in a solution of phosphoric acid ranging between 30% $H_3PO_4$ and 85% $H_3PO_4$.

9. In the electrolytic cell set forth in claim 7, the silver salt constituting a silver phosphate ($Ag_3PO_4$) of approximately one (1) normal (N) in a solution of approximately 62% phosphoric acid ($H_3PO_4$).

10. An electrolytic cell in combination, comprising
a liquid solution electrolyte,
a first electrode having a silver surface in contact and electrochemically active with said electrolyte, and
a second electrode, spaced from the first electrode, having an electrically conductive masking layer on its surface in contact and chemically inert to said electrolyte and said electrolyte comprising a composition of a silver phosphate ($Ag_3PO_4$) in a solution of phosphoric acid ($H_3PO_4$).

11. The electrolytic cell set forth in claim 10 wherein the silver phosphate ($Ag_3PO_4$) ranges between 0.1 N and 3 N in a solution of phosphoric acid ranging between 30% $H_3PO_4$ and 85% $H_3PO_4$.

12. The electrolytic cell set forth in claim 10 wherein the silver phosphate has approximately one (1) normal (N) in a solution of approximately 62% phosphoric acid ($H_3PO_4$).

13. The electrolytic cell set forth in claim 10 wherein the masking layer is gold.

14. An electrolytic cell in combination, comprising
a container-electrode with an opening and having an inner surface.
a liquid solution electrolyte in said container-electrode comprising a composition of a silver salt in a solution of phosphoric acid ($H_3PO_4$) or perchloric acid ($HClO_4$),
an electrode disposed within said container-electrode and having on outer surface spaced from the walls thereof,
either the inner surface or the outer surface being electrically conductive and chemically inert to said electrolyte and the other of the inner surface or the outer surface having silver, and
electrically insulative means sealing the opening of the container-electrode and supporting said electrode projecting therefrom in the container-electrode.

15. The electrolytic cell set forth in claim 14 wherein the silver salt is a silver phosphate ($Ag_3PO_4$) ranging between 0.1 N and 3 N in a solution of phosphoric acid ranging between 30% $H_3PO_4$ and 85% $H_3PO_4$.

16. The electrolytic cell set forth in claim 14 wherein the silver salt is a silver phophate ($Ag_3PO_4$) of approximately one (1) normal (N) in a solution of approximately 62% phosphoric acid ($H_3PO_4$).

17. The electrolytic cell set forth in claim 14 wherein the chemically inert surface is gold.

References Cited
UNITED STATES PATENTS

| | | | |
|---|---|---|---|
| 2,736,846 | 2/1956 | Gables | 317—230 |
| 2,791,473 | 5/1957 | Mattox | 317—231 X |
| 3,017,612 | 1/1962 | Singer | 317—231 X |
| 3,158,798 | 11/1964 | Sauder | 317—231 |
| 3,210,662 | 10/1965 | Steinmetz et al. | 317—231 X |

JAMES D. KALLAM, *Primary Examiner.*

U.S. Cl. X.R.

252—62.2